United States Patent [19]

Stewart et al.

[11] Patent Number: 5,538,377
[45] Date of Patent: Jul. 23, 1996

[54] ENCLOSED NUT RETAINER

[75] Inventors: Robert E. Stewart, Westland; Carl Lewis, Sterling Heights, both of Mich.

[73] Assignee: Multifastener Corporation, Detroit, Mich.

[21] Appl. No.: 225,747

[22] Filed: Apr. 11, 1994

[51] Int. Cl.[6] .............. F16B 37/04; F16B 37/12
[52] U.S. Cl. ............ 411/174; 411/112; 411/431; 411/999
[58] Field of Search ................ 411/84, 85, 111, 411/112, 113, 174, 175, 428, 429, 430, 431, 966, 970, 971, 999

[56] References Cited

U.S. PATENT DOCUMENTS

| | | | |
|---|---|---|---|
| 2,249,923 | 7/1941 | Whitcombe | 411/85 |
| 2,394,729 | 2/1946 | Tinnerman | 411/112 |
| 2,413,669 | 2/1946 | Whitcombe | 411/85 |
| 2,797,720 | 7/1957 | Mann . | |
| 3,411,816 | 11/1968 | Andrews et al. | 287/189.36 |
| 3,670,796 | 6/1972 | Grimm | 411/112 |
| 4,676,706 | 6/1987 | Inaga | 411/175 |
| 4,859,108 | 8/1989 | Maddox | 403/277 |
| 5,039,264 | 8/1991 | Benn | 411/175 |

*Primary Examiner*—Neill R. Wilson
*Attorney, Agent, or Firm*—Howard & Howard

[57] ABSTRACT

The present invention relates to an enclosed nut and bolt retainer to protect against the penetration of adjacent objects by the end of the bolt. The retainer is formed by drawing an enclosed pocket from a material, such as metal. The pocket has an opening for receipt of a nut, which is preferably press fit into the pocket. The pocket is deep enough to provide space between the bolt end, when fully threaded into the nut, and the bottom of the pocket. In this way, the bolt is shielded by the pocket enclosure.

4 Claims, 1 Drawing Sheet

ENCLOSED NUT RETAINER

BACKGROUND

The present invention generally relates to a mounting bracket. More specifically, it relates to a mounting bracket that shields the end of a fastener, such as a bolt, to prevent the end of the fastener from penetrating any adjacent objects.

In many applications, it is important to ensure against fasteners penetrating certain objects around the fastener. One such example is when fasteners are used around the fuel cell of an automobile. For example, a fuel sensor may be mounted to the welded fuel cell flanges of a fuel cell. Typically, a bracket is used and a bolt extends through the bracket and flange. The bolt might be a self-tapping bolt, or it might have a nut on the end. As should be appreciated, the exposed end of the bolt could penetrate the fuel cell in a collision.

The only presently known method of protecting against puncture is to use an acorn-type nut to cover the end of the bolt. The difficulty with an acorn nut, however, is the cost when compared to a normal nut. Further, in some instances, the acorn nut merely becomes the end of the bolt and poses the same potential for penetrating the fuel tank as the exposed bolt.

SUMMARY OF THE INVENTION

The present invention overcomes the above problems by providing a nut retainer having the nut press fit within a drawn pocket. The pocket is drawn deeply enough to provide space between the nut and the base of the pocket. When a bolt is threaded into the nut, space is provided between the end of the bolt and the pocket base. In this way, upon impact, the bolt has space to move within the pocket without engaging the pocket, eliminating, or at least greatly reducing, the potential for penetration of the fuel cell.

More specifically, the nut retainer is formed from sheet steel and includes an integrally drawn enclosed pocket with one opening. In the preferred embodiment, the pocket has a polygonal side wall and a bottom wall. A nut having a mating polygonal body portion is press fit into the pocket, with the polygonal sides of the body portion engaging the polygonal side walls of the pocket. When fully seated in the pocket, the nut is spaced from the bottom wall of the pocket to form an enclosed chamber between the nut and the bottom wall. When a bolt is threaded into the nut, the nut is held against rotation, because of the engaged polygonal sides and side wall, and the bolt end is within the chamber, spaced from the bottom wall.

The disclosed retainer includes a clip portion that allows it to be clipped to the flange of a fuel cell. With minor modifications, the disclosed clip could be used to support a fuel-sensing unit. It should be understood by those of ordinary skill in the art that other applications for the invention are available, whether related to use on a vehicle, or otherwise.

Other advantages and meritorious features of the present invention will become more fully understood from the following description of the preferred embodiments, the appended claims, and the drawings, a brief description of which follows.

DETAILED DESCRIPTION OF THE DRAWINGS

DETAILED DESCRIPTION OF THE INVENTION

Figure 2:
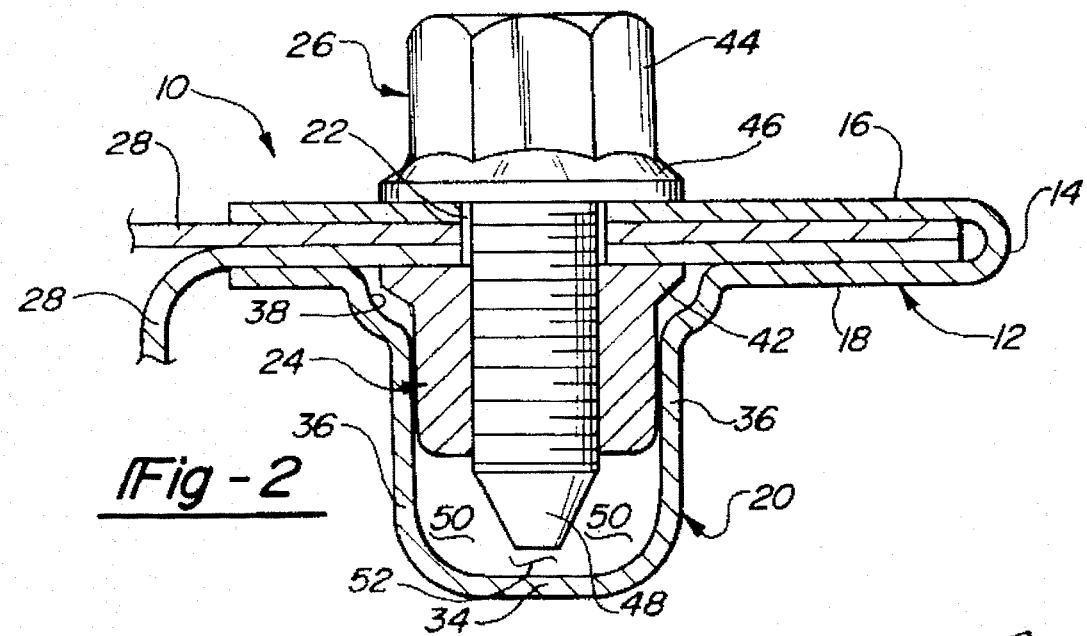
FIG. 2 is a cross-sectional view taken along line 2—2 of FIG. 1.

With reference to FIG. 2, the enclosed nut retainer of the present invention is shown generally at 10. In the illustrated embodiment, the nut retainer 10 has a clip body 12, which, as illustrated, is folded over at 14 to form overlapping legs 16 and 18. A pocket or shell 20 is drawn from leg 18 and is adapted to receive a nut 24. In the preferred embodiment, the nut 24 is a standard hexagon flange nut, which is press fit into pocket 20. Nut 24 is adapted to receive a bolt 26, which in the preferred embodiment, is a hexagon flange bolt. An aperture 22 is formed in leg 16 and is generally concentric with the opening of pocket 20. Aperture 22 is adapted to receive bolt 26 so that it can be threaded into nut 24.

Figure 1:
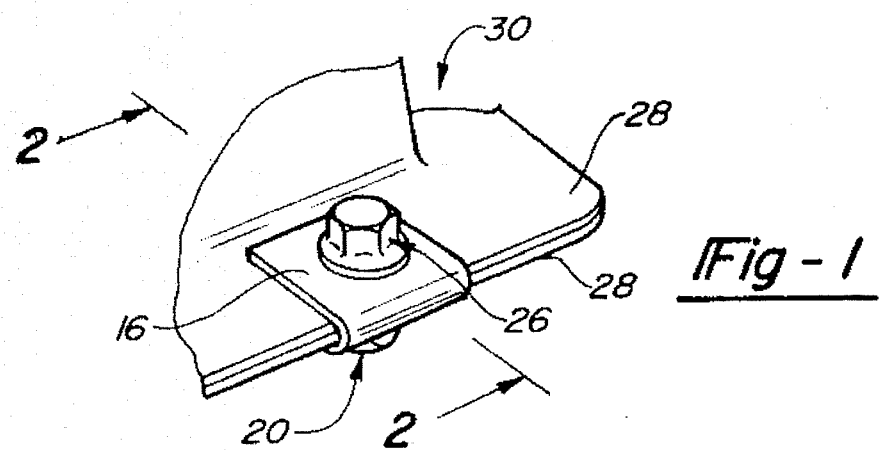
FIG. 1 is a partial perspective view of the enclosed nut retainer of the present invention mounted to a fuel cell.

In the illustration of FIG. 1, the retainer 10 is mounted upon the fuel cell flanges 28 of a fuel cell 30. One use of the retainer 10, when mounted to a fuel cell, is to mount a fuel sending unit adjacent to the fuel cell. As will be appreciated by those of ordinary skill in the art, consideration must be given to the potential for penetration of the fuel cell by the bolt 26 during a collision, etc. The present retainer 10 is adapted to protect against the bolt 26 puncturing the fuel cell in the event of a collision. In order to provide this protection, the bolt 26 is contained within the pocket 20, and space is provided around bolt 26 within pocket 20 to allow for movement of the bolt 26 during impact without the bolt 26 penetrating pocket 26 or cell 30.

Figure 4:
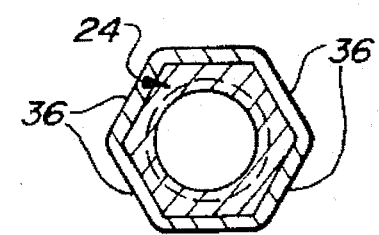
FIG. 4 is a cross-sectional view taken along line 4—4 of FIG. 3.

The pocket or shell 20 of the present invention includes a base 34, walls 36, and a recessed area 38. In the preferred embodiment, the walls 36 are hexagonal in shape (see FIG. 4) for receipt of a standard hexagon flange nut 24, and the base 34 is defined by a concave bottom wall. The interaction between the walls 36 and the hexagon nut secure the nut within pocket 20 against rotation. In this way, bolt 26 can be threaded into nut 24 and torqued down to a sufficient torque for retaining purposes without the use of an additional tool for holding the nut 24. This greatly facilitates assembly and reduces labor costs in the assembly process of a vehicle. In the preferred embodiment, the nut 24 is press fit into the drawn pocket 20 to fully retain it within the pocket and retain it from rotation. As should be appreciated, the outer diameter of the nut 24 is slightly greater than the inner diameter of the pocket 20.

Figure 3:
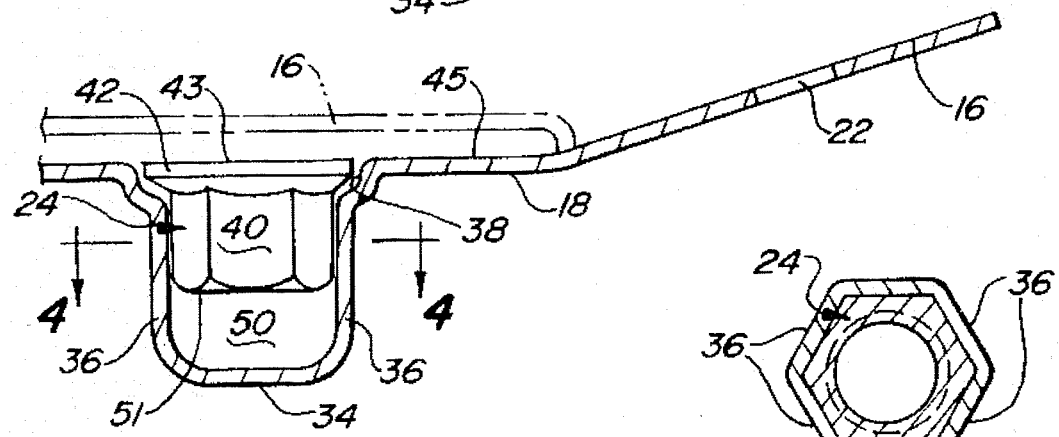
FIG. 3 is a cross-sectional view of the enclosed nut retainer, with a nut seated within the drawn pocket.

The nut 24 includes flats (see FIGS. 3 and 4) and a flange portion 42. As illustrated in FIGS. 2 and 3, the flange 42 is received within the recessed portion 38 of pocket 20 so that the top 43 of nut 24 is either below the top 45 of leg 18 or in line with top 45.

As illustrated in FIG. 2, the preferred bolt is a hexagon flange bolt having flats 44 for receipt of a torquing tool, a chamfer 46, and a dog point end 48. The dog point end 48 facilitates rapid assembly of bolt 26 to nut 24. As should be appreciated, the flanges 28 of cell 30 include a hole for receipt of the body 49 of bolt 26. In this way, the retainer 10, with the nut 24 properly seated in pocket 20, can be clipped onto flange 42 with aperture 22 and pocket 20 co-axially aligned with the hole in flange 28.

Referring again to FIGS. 2 and 3, the pocket 20 has sufficient depth to provide a chamber 50 between the end 51 of nut 24 and base 34 of pocket 20. Further, the pocket 20 has sufficient depth to provide a space 52 between the dog point 48 and base 34. In this way, in an impact situation, nut 26 is free to move within pocket 20 a distance sufficient to absorb the impact but prevent puncture of pocket 20 or cell 30.

Preferably, the retainer 10 is formed in a progressive stamping operation wherein the pocket 20 is first drawn by a stamping operation. Either simultaneously with the drawing operation or following the drawing operation, the nut 24 is press fit into pocket 20. As should be appreciated, the inner diameter of pocket 20 is slightly less than the outer diameter of nut 24 to permit press fitting. Thereafter, through progressive stamping operations, the legs 16 and 18 are created by folding over retainer 10 at 14.

In use, a hole is formed in flanges 28, and retainer 10 is clipped over flanges 28 with aperture 22 aligned with the hole formed. Bolt 26 is then threaded inserted through aperture 22, and threaded into nut 24 and sufficiently torqued pursuant to the torquing requirements.

The foregoing detailed description shows that the preferred embodiments of the present invention are well suited to fulfill the objects of the invention, it is recognized that those skilled int eh art may make various modifications or additions to the preferred embodiments chosen here to illustrate the present invention without department from the spirit of the present invention. Accordingly, it is to be understood that the subject matter sought to be effected protection hereby should be deemed to extend to the subject matter defined in the appended claims, including all fair equivalents thereof.

What is claimed is:

1. An enclosed nut retainer, comprising: a sheet steel panel having an integrally drawn enclosed pocket having a polygonal side wall, a bottom wall and an opening in said panel, a nut having a mating polygonal body portion press fit in said polygonal pocket side wall, a nut bore through said nut body coaxially aligned with said pocket and an end portion spaced from said pocket bottom wall and an enclosed chamber in said pocket between said nut end portion and said pocket bottom wall, adapted to receive the end of a male threaded fastener threaded in said nut bore.

2. The retainer of claim 1, wherein said pocket in said retainer has an integral concave bottom wall spaced from said nut forming an enclosed chamber adapted to receive the end of a male threaded member.

3. The retainer of claim 1, wherein said nut includes radial flange portion adjacent one end, said retainer including said polygonal body portion being mounted within said pocket opening with said nut radial flange being flush mounted in said pocket.

4. The retainer of claim 1, wherein said retainer is formed from a sheet steel strip, with said pocket drawn in said strip, said nut being press fit within said pocket, and said strip further having an aperture formed a spaced distance from said pocket, said strip being folded over said pocket and said nut with said aperture co-axially aligned with said nut and forming a U-shaped bracket.

\* \* \* \* \*